United States Patent
Kawai

(10) Patent No.: US 9,654,394 B2
(45) Date of Patent: May 16, 2017

(54) MULTI-TENANT SYSTEM, SWITCH, CONTROLLER AND PACKET TRANSFERRING METHOD

(71) Applicant: NEC CORPORATION, Tokyo (JP)

(72) Inventor: Ryosuke Kawai, Tokyo (JP)

(73) Assignee: NEC Corporation, Tokyo (JP)

(*) Notice: Subject to any disclaimer, the term of this patent is extended or adjusted under 35 U.S.C. 154(b) by 219 days.

(21) Appl. No.: 14/401,003

(22) PCT Filed: May 15, 2013

(86) PCT No.: PCT/JP2013/063603
§ 371 (c)(1),
(2) Date: Nov. 13, 2014

(87) PCT Pub. No.: WO2013/172391
PCT Pub. Date: Nov. 21, 2013

(65) Prior Publication Data
US 2015/0146736 A1    May 28, 2015

(30) Foreign Application Priority Data

May 15, 2012  (JP) .................................. 2012-111881

(51) Int. Cl.
*H04L 12/741* (2013.01)
*H04L 12/933* (2013.01)
(Continued)

(52) U.S. Cl.
CPC .......... *H04L 45/74* (2013.01); *H04L 12/4633* (2013.01); *H04L 45/745* (2013.01);
(Continued)

(58) Field of Classification Search
None
See application file for complete search history.

(56) References Cited

U.S. PATENT DOCUMENTS

2010/0257263 A1   10/2010   Casado et al.
2011/0283017 A1*  11/2011   Alkhatib ............ H04L 12/4641
                                                         709/244
(Continued)

FOREIGN PATENT DOCUMENTS

CA      2 810 660 A1    3/2012
CN      101639770 A     2/2010
(Continued)

OTHER PUBLICATIONS

Chinese Office Action dated Sep. 24, 2015 with a partial English translation thereof.
(Continued)

*Primary Examiner* — Huy D Vu
*Assistant Examiner* — Hong Shao
(74) *Attorney, Agent, or Firm* — McGinn IP Law Group, PLLC

(57) ABSTRACT

A multi-tenant system is realized by the Tunneling protocol. The multi-tenant system includes a server apparatus on which a virtual machine with tenant identification data operates; an equipment whose tenant identification data cannot be recognized; a plurality of switches configured to transfer a packet based on flow entries; and a controller configured to set the flow entries to the switches. The plurality of switches includes a first switch connected with the server apparatus and a second switch connected with the equipment. The second switch rewrites the header of the packet sent from and received by the equipment based on an address translation table. Thus, the equipment becomes available.

6 Claims, 15 Drawing Sheets

(51) Int. Cl.
*H04L 12/46* (2006.01)
*H04L 29/08* (2006.01)
*H04L 29/12* (2006.01)

(52) U.S. Cl.
CPC .......... *H04L 49/15* (2013.01); *H04L 61/2596* (2013.01); *H04L 67/1097* (2013.01)

(56) References Cited

U.S. PATENT DOCUMENTS

| | | |
|---|---|---|
| 2011/0299537 A1 | 12/2011 | Saraiya et al. |
| 2012/0311120 A1* | 12/2012 | Yasuda ................. H04L 41/145 709/223 |
| 2014/0115584 A1* | 4/2014 | Mudigonda ......... H04L 67/1095 718/1 |

FOREIGN PATENT DOCUMENTS

| | | |
|---|---|---|
| JP | 2001-136198 A | 5/2001 |
| JP | 2006-128803 A | 5/2006 |
| JP | 2009-152953 A | 7/2009 |
| WO | WO 2010/115060 A2 | 10/2010 |
| WO | WO 2011/142972 A2 | 11/2011 |
| WO | WO 2013/069133 A1 | 5/2013 |

OTHER PUBLICATIONS

Kimihiko Fukami et. al., "Load Balancing System and Its Applications Using Openflow", The Institute of Electronics Information and Communication Engineers (IEICE) Technical Report, Mar. 2012, vol. 111 No. 469, p. 401-406.
English Translation of the International Preliminary Report on Patentability in PCT Application No. PCT/JP2013/063603 dated Nov. 27, 2014.
Extended European Search Report dated Dec. 10, 2015.
Mudigonda et al., "Netlord: A Scalable Multi-Tenant Network Architecture for Virtualized Datacenters", SIGCOMM, ACM, USA, Aug. 15, 2011, p. 62-73, XP058006640.
Lasserre et al., "Framework for DC Network Virtualization, draft-lasserre-nvo3-framework-01.txt", IETF, (ISOC) 4, Switzerland, Mar. 12, 2012, p. 1-23, XP015081907.
International Search Report (ISR) (PCT Form PCT/ISA/210), in PCT/JP2013/063603, dated Aug. 20, 2013.
Japanese Office Action dated Sep. 24, 2015 with a partial English translation thereof.
Chinese Office Action dated Aug. 3, 2016 with an English translation thereof.

* cited by examiner

FIG. 6

| RULE | ACTION | STATISTIC | ~25 |
|---|---|---|---|
|  |  |  |  |
|  |  |  |  |
|  |  |  |  |

FIG. 7

| MAC ADDRESS | SWITCH PORT NO. | ~26 |
|---|---|---|
|  |  |  |
|  |  |  |
|  |  |  |

FIG. 8

| MAC ADDRESS | TENANT ID DATA |
|---|---|
|  |  |
|  |  |
|  |  |

| GATEWAY ID | IP ADDRESS |
|---|---|
|  |  |
|  |  |
|  |  |

| DESTINATION IP ADDRESS | DESTINATION PORT NO. | DESTINATION TENANT | ASSIGNED IP ADDRESS | ASSIGNED PORT NO. | SOURCE GATEWAY | SOURCE VM |
|---|---|---|---|---|---|---|
| | | | | | | |
| | | | | | | |
| | | | | | | |

29

MULTI-TENANT SYSTEM, SWITCH, CONTROLLER AND PACKET TRANSFERRING METHOD

TECHNICAL FIELD

The present invention is related to a multi-tenant system, and especially, to a multi-tenant system in which an equipment whose tenant identification data cannot be recognized is connected.

BACKGROUND ART

In the cloud computing, a multi-tenant system is known which shares a server apparatus and hardware devices such as switches and a storage unit among a plurality of users. FIG. 1 is a diagram showing a resource sharing level in the multi-tenant system. According to the resource sharing level, there are use forms such as IaaS (Infrastructure as a Service), PaaS (Platform as a Service) and SaaS (Software as a Service) in the multi-tenant system. In the conventional system (a single tenant system), the hardware, the OS/middleware and the application software are managed by a user. In the IaaS, a system vendor manages the hardware and the user manages the application software and the OS/the middleware. In the PaaS, the system vendor manages the hardware and the OS/middleware and the user manages the application software. In the SaaS, the system vendor manages the hardware, the OS/middleware and the application software.

The multi-tenant system is often realized by using the tunneling protocol such as GRE (Generic Routing Encapsulation). The reason is in that tenant identification data can be added when a packet is encapsulated. Also, when using the tunneling protocol, there is an advantage that the number of tenants allowed to produce is not limited, compared with a case of realizing the multi-tenant system by using VLAN. FIG. 2 is a diagram showing the multi-tenant system which uses the tunneling protocol. In FIG. 2, a tenant A network and a tenant B network are built up in DC (Data Center) 1. In the same way, a tenant A network and a tenant B network are built up in DC 2. The tenant A network of DC 1 and the tenant A network of DC 2 are connected by using the tunneling protocol. The gateway of DC 1 and the gateway of DC 2 carry out the production of an encapsulated packet through addition of header data (hereinafter, to be referred to as "addition data") and decapsulation of the encapsulated packet by removing the addition data. At this time, the tenant identification data is contained in the addition data of the encapsulated packet in addition to the L3 header.

There are needs to use SAN (Storage Area Network) as a sharing storage of the tenant A network and the tenant B network in the multi-tenant system environment like DC 1 or DC 2 in FIG. 2. However, any equipment whose tenant identification data cannot be recognized (for example, SAN owned by a system vendor and a user as existing property) is not designed to receive the encapsulated packet by the tunneling protocol. For this reason, the equipment whose existing tenant identification data cannot be recognized cannot read the tenant identification data in the encapsulated packet and cannot be used for the multi-tenant system.

On the other hand, the open flow network system is known in which the transfer processing of a packet by switches and the control processing of the switches are separated. The open flow network system includes one or more switches and a controller which instructs the packet transfer control of the switches. The controller sets a flow entry to a flow table of the switch. The switch transfers the packet based on the flow entry. The switch transfers the packet to the controller when the flow entry for the processing of the packet is not in the flow table upon receiving the packet (hereinafter, to be referred to as "Packet-In"). The controller produces the flow entry based on the packet subjected to Packet-In and sets the flow entry to the switch which transfers the packet. The controller replies the packet (hereinafter, to be referred to as Packet-Out) to the switch which has carried out Packet-In after setting the flow entry to the switch that it does a packet.

As Patent Literature 1 which relates to the field of the present invention, JP 2009-152953A is known. The Patent Literature 1 discloses a gateway apparatus and a packet transferring method which can be used when the multi-tenant system is realized, by rewriting an application header.

CITATION LIST

[Patent Literature 1] JP 2009-152953A

SUMMARY OF THE INVENTION

An object of the present invention is to provide a multi-tenant system which can use an equipment whose tenant identification data cannot be recognized.

The multi-tenant system of the present invention includes a server apparatus on which a virtual machine (VM) with tenant identification data operates, an equipment whose tenant identification data cannot be recognized, a plurality of switches configured to transfer a packet based on flow entries, and a controller configured to set the flow entries to the plurality of switches. The plurality of switches includes a first switch connected with the server apparatus and a second switch connected with the equipment whose tenant identification data cannot be recognized.

The first switch includes a processing section which encapsulates the packet transmitted from the virtual machine (VM) to the equipment whose tenant identification data cannot be recognized, by adding addition data which contains the tenant identification data of the virtual machine (VM), to produce an encapsulated packet, and a transfer processing section which carries out packet-in of the encapsulated packet into the controller and which transfers the encapsulated packet subjected to packet-out from the controller, based on the flow entry.

The controller includes a route calculating section which calculates the out-bound route of the encapsulated packet subjected to the packet-in and a flow entry setting section which sets a flow entry to each of the switches on the out-bound route. The controller sets to the second switch, the flow entry which prescribes an operation of removing addition data from the encapsulated packet.

The second switch includes a transfer processing section which receives the encapsulated packet; a processing section which removes the addition data of the encapsulated packet based on the flow entry; and an address translation section which translates a source IP address of the packet into an IP address managed by the second switch based on an address translation table. The transfer processing section transmits the packet in which the source IP address has been translated, to the equipment whose tenant identification data cannot be recognized.

The packet transferring method of the present invention is a packet transferring method which is executed by the multi-tenant system. The packet transferring method of the present invention includes transmitting a packet from a virtual machine (VM) to an equipment whose tenant identification data cannot be recognized; carrying out packet-in of the packet into a controller by a first switch; calculating an out-bound route of the packet by the controller; and setting flow entries used to transfer the packet to switches on the out-bound route by the controller. In the setting, the flow entry which prescribes an operation of encapsulating the packet by adding addition data which includes the tenant identification data of a virtual machine (VM) to the packet is set to the first switch. Also, the flow entry which describes an operation of removing the addition data from the encapsulated packet is set to the second switch. The packet transferring method of the present invention further includes encapsulating, by the first switch, the packet based on the flow entry by adding the addition data which contains the tenant identification data of the virtual machine (VM); receiving the encapsulated packet by the second switch; removing the addition data from the encapsulated packet based on the flow entry by the second switch; translating, by the second switch, an source IP address of the packet from which the addition data has been removed, into an IP address managed by the second switch based on an address translation table; and transmitting the translated packet in which the source IP the address has been translated, to the equipment whose tenant identification data cannot be recognized.

According to the present invention, the multi-tenant system can be provided which can use the equipment whose tenant identification data cannot be recognized.

BRIEF DESCRIPTION OF THE DRAWINGS

The Object, effects, features of the above invention would become clearer from the description of the exemplary embodiments in conjunction with the attached drawings.

FIG. 6 is an example of a flow table 25 in the first exemplary embodiment of the present invention.

FIG. 7 is an example of a MAC address table 26 in the first exemplary embodiment of the present invention.

FIG. 8 is an example of a tenant management table 27 in the first exemplary embodiment of the present invention.

FIG. 9 is an example of a gateway management table 28 in the first exemplary embodiment of the present invention.

FIG. 10 is an example of an address translation table 29 in the first exemplary embodiment of the present invention.

DESCRIPTION OF THE EXEMPLARY EMBODIMENTS

A multi-tenant system according to exemplary embodiments of the present invention will be described below with reference to the attached drawings.

[First Exemplary Embodiment]

(Configuration)

Figure 1:
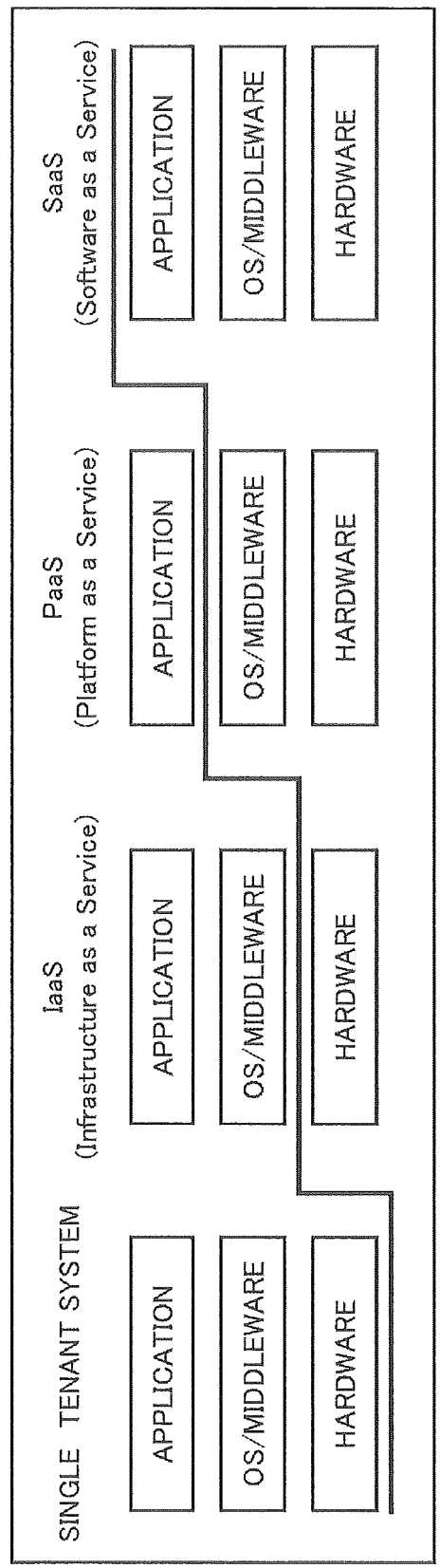
FIG. 1 is a diagram showing a sharing level of a resource in a multi-tenant system.
Figure 2:
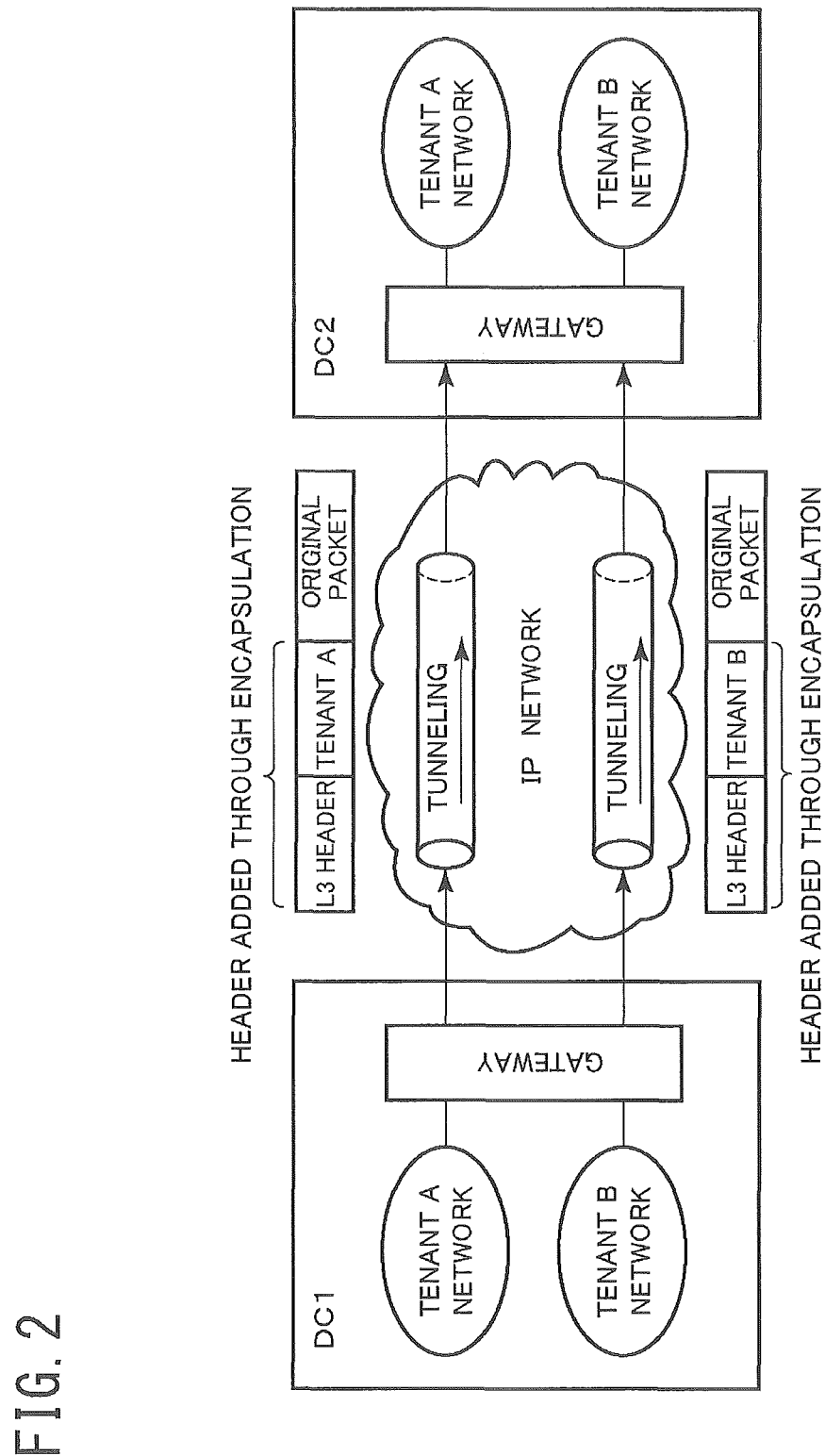
FIG. 2 is a diagram showing a multi-tenant system using a tunneling protocol.
Figure 3:
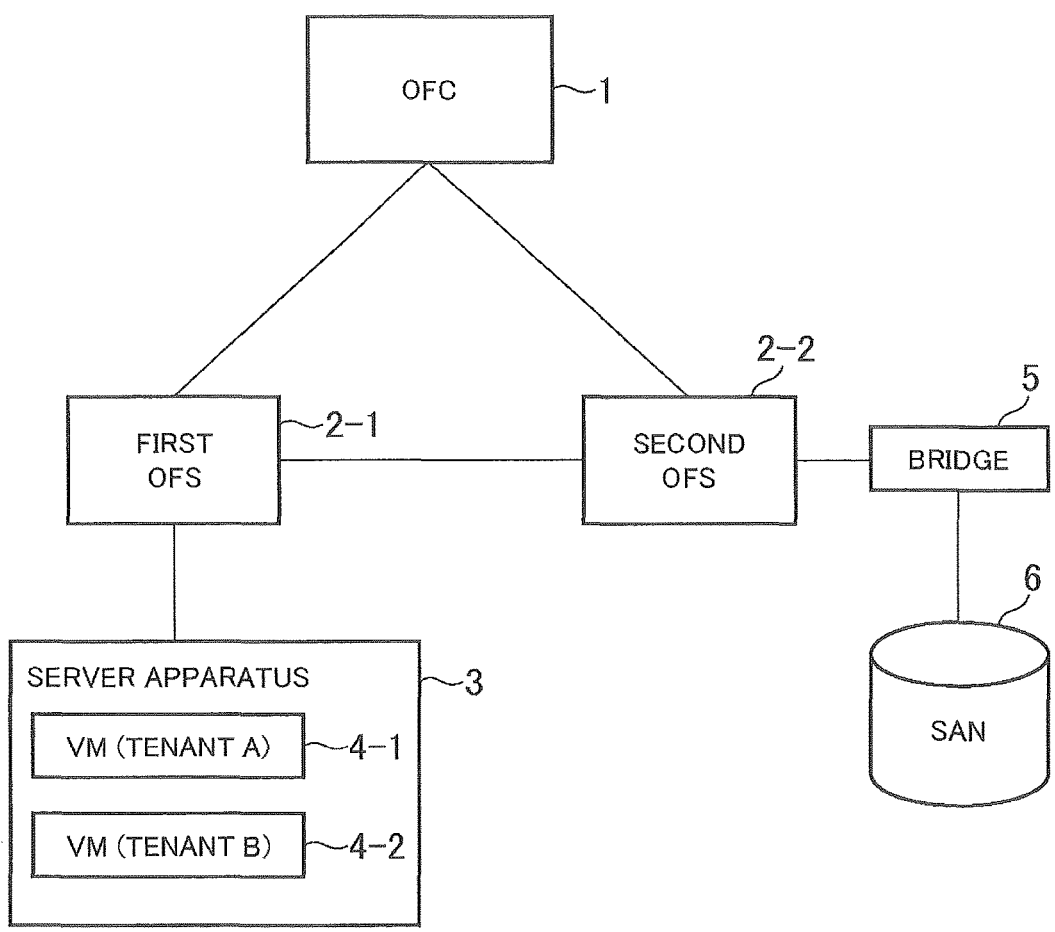
FIG. 3 is a diagram showing the whole configuration of a multi-tenant system according to a first exemplary embodiment of the present invention.

First, the configuration of the multi-tenant system of the exemplary embodiments will be described. FIG. 3 is a diagram showing the whole configuration of a multi-tenant system according to a first exemplary embodiment of the present invention. The multi-tenant system of the present exemplary embodiment includes an open flow controller (OFC) 1, a first open flow switch (OFS) 2-1, a second open flow switch (OFS) 2-2, a server apparatus 3, a bridge 5 and a SAN 6. The server apparatus 3 includes a virtual machine (VM) 4-1 and a virtual machine (VM) 4-2. The configuration example of FIG. 3 has a simple configuration for the description but apparatuses of an optional number may be connected with the multi-tenant system. Also, in the present exemplary embodiment, the description is made as the resources allocated to the user are the virtual machines (VM) which operate on the server apparatus but may be physical terminals such as personal computers.

Hereinafter, the first open flow switch (OFS) 2-1 and the second open flow switch (OFS) 2-2 are intensively called the open flow switches (OFS) 2, in case of not distinguishing between them. Also, the virtual machine (VM) 4-1 and the virtual machine (VM) 4-2 are intensively called the virtual machines (VM) 4 in case of not distinguishing between them.

Figure 4:
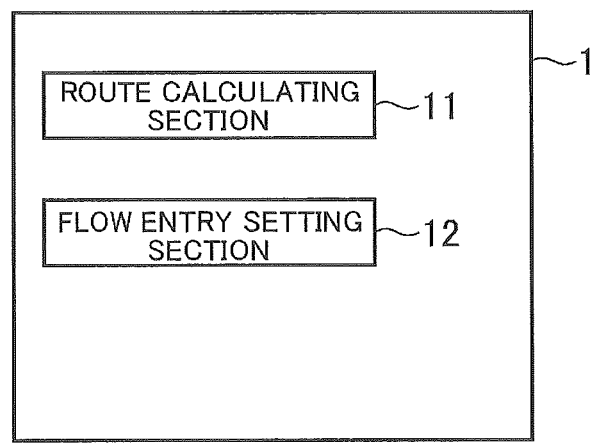
FIG. 4 is a block diagram of an open flow controller (OFC) 1 in the multi-tenant system according to the first exemplary embodiment of the present invention.

FIG. 4 is a block diagram showing the open flow controller (OFC) 1 in the multi-tenant system according to the first exemplary embodiment of the present invention. The open flow controller (OFC) 1 of the present exemplary embodiment includes a route calculating section 11 and a flow entry setting section 12. The route calculating section 11 calculates a transfer route of the open flow switches (OFS) 2 based on the received packet subjected to packet-in. The route calculating section 11 specifies a destination equipment, a transmission source equipment and the switches connected with the respective equipments based on a destination address and a source address in the packet, and calculates the route between the equipments as the transfer route based on topology data of the system (not shown). The flow entry setting section 12 sets flow entries which are necessary for transfer control of the packets, to the open flow switches (OFS) 2 on the transfer route calculated by the route calculating section 11.

Figure 5:
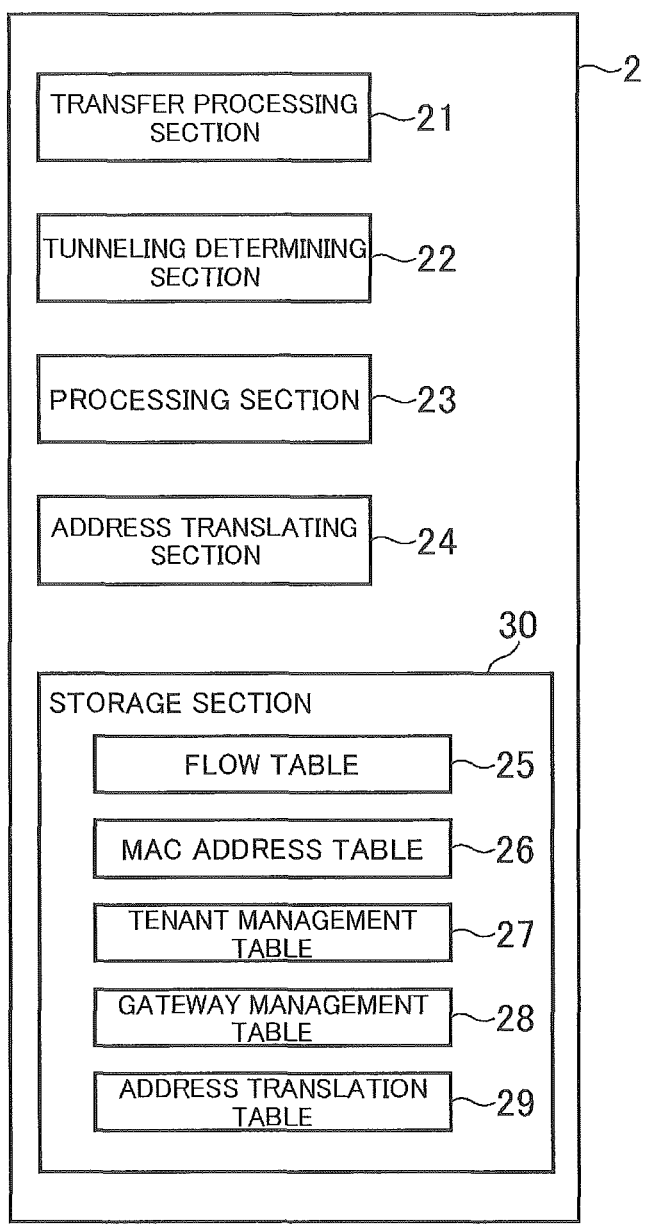
FIG. 5 is a block diagram of an open flow switch (OFS) 2 in the multi-tenant system according to the first exemplary embodiment of the present invention.

FIG. 5 is a block diagram of the open flow switch (OFS) 2 in the multi-tenant system according to the first exemplary embodiment of the present invention. The open flow switch (OFS) 2 of the present exemplary embodiment includes a transfer processing section 21, a tunneling determining section 22, a processing section 23, an address translating section 24 and a storage section 30. A flow table 25, a MAC address table 26, a tenant management table 27, a gateway management table 28 and an address translation table 29 are stored in the storage section 30.

The transfer processing section 21 transfers packets to a destination which is determined based on the tables stored in the storage section 30. The tunneling determining section 22 determines whether or not the packet received by the open flow switch (OFS) 2 has been encapsulated. Also, the tunneling determining section 22 determines whether or not the packet received by the open flow switch (OFS) 2 has to be encapsulated. The processing section 23 carries out the encapsulation of the packet received by the open flow switch (OFS) 2 and decapsulation of the encapsulated packet. The address translating section 24 translates a port number and an IP address which is contained in the packet, based on the address translation table 29. Note that the translation may be carried out to only either of the IP address or the port number.

Next, the tables stored in the storage section 30 will be described.

FIG. 6 is an example of the flow table 25 according to the first exemplary embodiment of the present invention. The flow table 25 manages the flow entry which contains an operation rule to a received packet which is defined based on a "rule", an "action" and "statistics". Data used to identify the packet is set to the "rule". For example, it is data as a combination of a VLAN ID and a packet transmission source IP address and so on. The "action" defines how the open flow switch (OFS) 2 should process the packet conforming to the data contained in the "rule". For example, a process of transmitting to a node having a predetermined IP address from a predetermined port of the open flow switch (OFS) 2 and a process of discarding a packet and so on are defined in the "action". For example, by combining the "rule" and the "action", the operation of discarding the packet can be set to the open flow switch (OFS) 2 when the protocol number is "1" (ICMP). The "statistics" are statistic data every flow entry. For example, it is the number of transfer packets and the number of transfer octets.

FIG. 7 is an example of the MAC address table 26 according to the first exemplary embodiment of the present invention. The MAC address table 26 manages a MAC address of an equipment which is connected with the open flow switch (OFS) 2, and a switch port number of the open flow switch (OFS) 2 with which the equipment having the MAC address is connected. Note that the MAC address may be a virtual MAC address which is allocated to the virtual machine (VM) and so on.

FIG. 8 is an example of the tenant management table 27 according to the first exemplary embodiment of the present invention. The tenant management table 27 manages a MAC address of the equipment which is connected with the open flow switch (OFS) 2 and tenant identification (ID) data of a tenant system to which the equipment having the MAC address belongs. Note that the MAC address may be a virtual MAC address which is allocated to a virtual machine (VM). Also, it is not necessary for the virtual machine (VM) to have the tenant identification data and a tenant to which the virtual machine (VM) belongs may be managed by the open flow switch (OFS) giving the tenant identification data to the virtual machine (VM). For example the tenant identification data can be managed in a layer of Hyper-Visor. In this case, the open flow switch (OFS) 2 which receives the packet transmitted from the virtual machine (VM) inquires a tenant to which the virtual machine (VM) belongs, to the Hyper-Visor and adds the tenant identification data to the packet.

FIG. 9 is an example of the gateway management table 28 according to the first exemplary embodiment of the present invention. The gateway management table 28 manages an IP address of a gateway for every gateway ID. The gateway ID is an identifier which identifies the gateway uniquely, and is allocated to be incremented from an optional number expressed with "1" and "0".

FIG. 10 is an example of the address translation table 29 according to the first exemplary embodiment of the present invention. The address translation table 29 manages a destination IP address, a destination port number, a destination tenant, an allocated IP address, an allocated port number, a source gateway and a source virtual machine (VM). The destination IP address and the destination port number indicate an IP address and a port number of an equipment which is connected with the multi-tenant system and whose tenant identification data cannot be recognized (hereinafter, to be referred to as an "identification impossible unit"). The destination tenant is a tenant which is connected with the multi-tenant system and which is allocated to the identifying impossible unit. By allocating a plurality of tenants to one identification impossible unit, a plurality of tenant systems may share the identification impossible unit. The allocated IP address and the allocated port number are a source IP address and a source port number set for the identification impossible unit when a packet is transmitted to the identification impossible unit from the open flow switch (OFS) 2. The source gateway is data used to identify the source open flow switch (OFS) 2 of the packet having header data to be rewritten based on the address translation table 29. The source virtual machine (VM) is data used to identify the source virtual machine (VM) 4 of the packet having the header data to be rewritten, based on the address translation table 29. Note that the address translation table 29 may manage only the destination IP address and the allocated IP address when the destination port number and the allocated port number are not used.

(Operation)

Next, a packet transferring method in the multi-tenant system of the present exemplary embodiment will be described.

Figure 11:
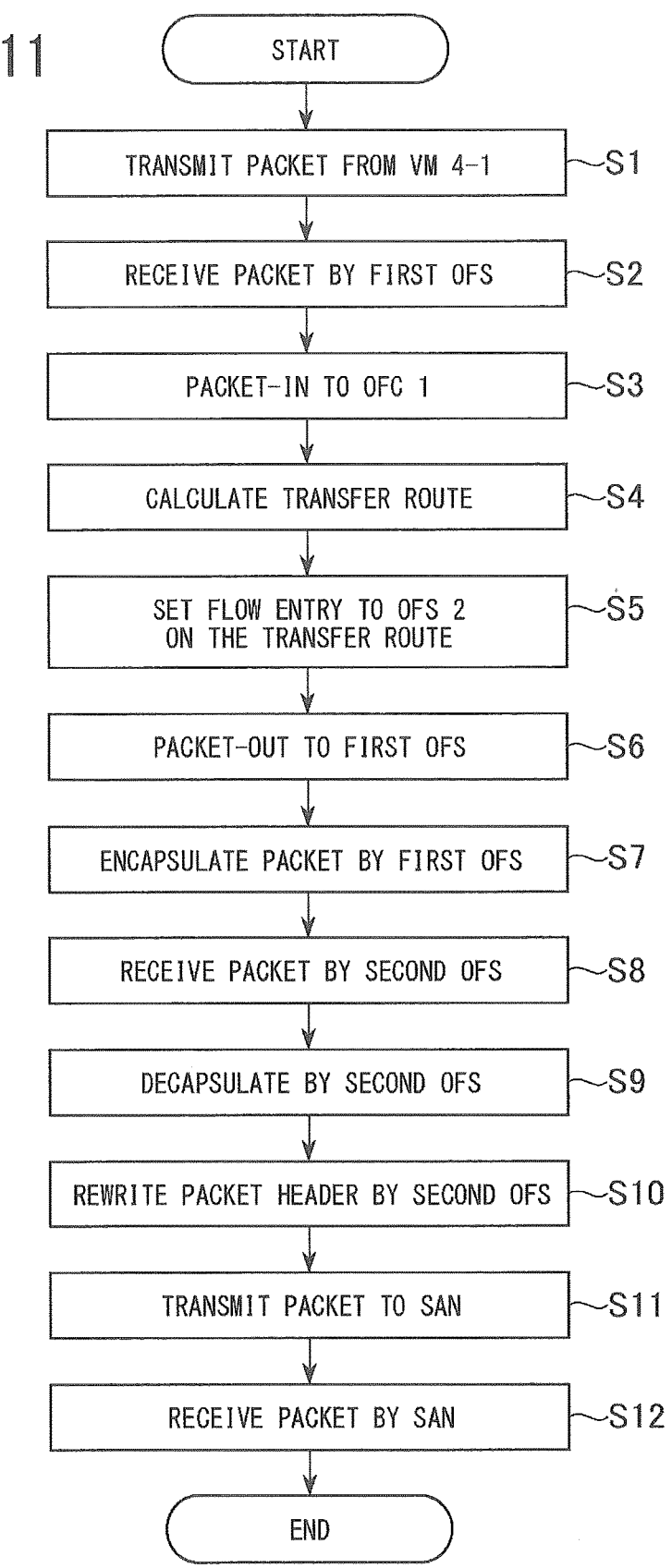
FIG. 11 is a flow chart of a packet transferring method (out-bound) in the multi-tenant system according to the first exemplary embodiment of the present invention.
Figure 12:
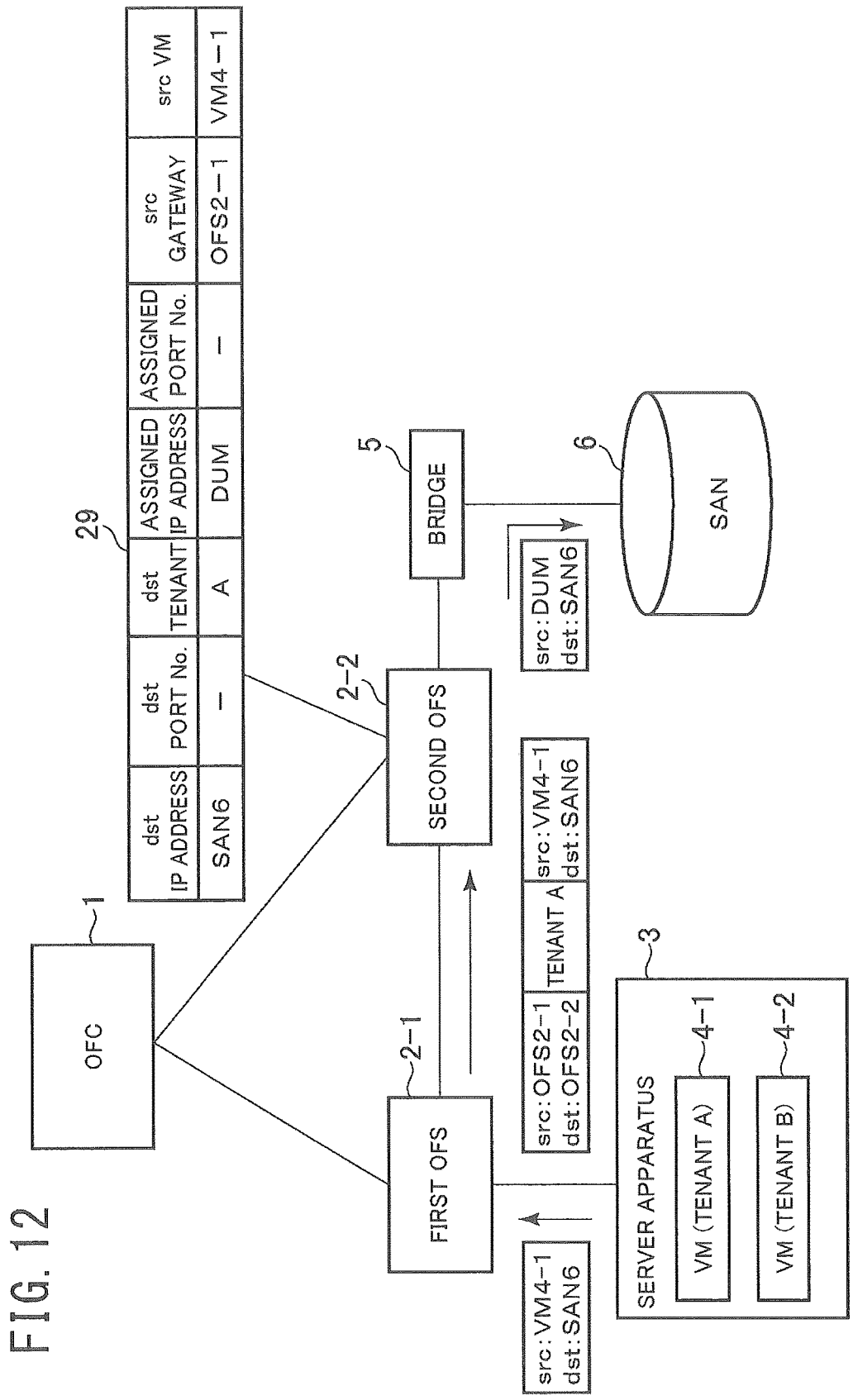
FIG. 12 is a diagram schematically showing a packet on an out-bound route (virtual machine (VM) 4-1 →SAN 6) in the packet transferring method (out-bound) of FIG. 11.

First, the packet transferring method (out-bound) will be described. FIG. 11 is a flow chart of the packet transferring method (out-bound) in the multi-tenant system according to the first exemplary embodiment of the present invention. FIG. 12 is a diagram schematically showing a packet on the out-bound route (the virtual machine (VM) 4-1→SAN 6) in the packet transferring method (out-bound) of FIG. 11. The operation when the first open flow switch (OFS) 2-1 receives a packet transmitted from the virtual machine (VM) 4-1 to the SAN 6 as the identification impossible unit for the first time will be described below.

(Step S1)

The virtual machine (VM) 4-1 belonging to the tenant A system transmits a packet for SAN 6 as the identification impossible unit. Note that in FIG. 12, the packet (src: virtual machine (VM) 4-1, dst: SAN 6) which is transmitted to the first open flow switch (OFS) 2-1 from the server apparatus 3 corresponds to the above packet. Here, "src: VM 4-1" indicates that the source IP address is an IP address which is allocated to the virtual machine (VM) 4-1. In the same way, "dst: SAN 6" shows that the transmission destination IP address is an IP address allocated to the SAN 6.

(Step S2)

The first open flow switch (OFS) 2-1 receives the packet transmitted at the step S1. The first open flow switch (OFS) 2-1 compares a MAC address corresponding to the destination IP address of the packet and the MAC address table 26. The first open flow switch (OFS) 2-1 determines that an equipment corresponding to the MAC address is connected with another open flow switch (OFS) 2 (or, the unit corresponding to the MAC address is not connected with the first open flow switch (OFS) 2-1), when the MAC address is not managed in the MAC address table 26. In this case, the first open flow switch (OFS) 2-1 determines that it is necessary to encapsulate the packet. In this example, the first open flow switch (OFS) 2-1 refers to the packet to determine that the equipment corresponding to the destination IP address of the received packet (the SAN 6 in this example) is not connected with the first open flow switch (OFS) 2-1.

(Step S3)

The first open flow switch (OFS) 2-1 carries out packet-in of the packet into the open flow controller (OFC) 1, in order to inquire the transfer route of the received packet and a destination IP address in encapsulating the packet to the open flow controller (OFC) 1. In this example, the first open flow switch (OFS) 2-1 determines whether or not the encapsulation should be carried out, based on the MAC address table 26, at the step S2, and determines whether or not it is necessary to inquire data necessary for the encapsulation to the open flow controller (OFC) 1 (Step S3). Note that the first open flow switch (OFS) 2-1 may determine that the inquiry to the open flow controller (OFC) 1 is necessary, without referring to the MAC address table 26 when the flow table 25 does not have any flow entry used to transfer the received packet.

(Step S4)

The open flow controller (OFC) 1 specifies that the open flow switch (OFS) 2 connected with the SAN 6 as destination of the packet subjected to the packet-in is the second open flow switch (OFS) 2-2. The open flow controller (OFC) 1 calculates the out-bound route used to transmit the packet-in packet to the second open flow switch (OFS) 2-2.

(Step S5)

The open flow controller (OFC) 1 sets a flow entry used to transfer the packet to each of the switches on the out-bound route calculated at the step S4. Note that in FIG. 12, only the first open flow switch (OFS) 2-1 and the second open flow switch (OFS) 2-2 are shown to simplify the description. However, a plurality of open flow switches (OFS) 2 may exist between the first open flow switch (OFS) 2-1 and the second open flow switch (OFS) 2-2. In such a case, the flow entry is set to each of the open flow switches (OFS) 2 between the first open flow switch (OFS) 2-1 and the second open flow switch (OFS) 2-2.

Also, the open flow controller (OFC) 1 sets the flow entry which prescribes an operation of encapsulating the packet by adding addition data, to the first open flow switch (OFS) 2-1 as a packet-in source.

Also, the open flow controller (OFC) 1 sets the flow entry which prescribes an operation of removing the addition data (decapsulation) to the second open flow switch (OFS) 2-2 as a termination edge connected with the identification impossible unit.

(Step S6)

The open flow controller (OFC) 1 carries out packet-out of the packet subject to the packet-in at the step S3, to the first open flow switch (OFS) 2-1.

(Step S7)

The first open flow switch (OFS) 2-1 produces an encapsulated packet by encapsulating the packet subjected to the packet-in (the packet received at the step S2) based on the flow entry set by the open flow controller (OFC) 1 by using the addition data. For example, the addition data contains an L3 header (source IP address: open flow switch (OFS) 2-1, destination IP address: open flow switch (OFS) 2-2) and the tenant identification data (tenant A). Here, the "source IP address: open flow switch (OFS) 2-1" means that the source IP address of the encapsulated packet is the IP address of the first open flow switch (OFS) 2-1. In the same way, the "destination IP address: open flow switch (OFS) 2-2" means that the destination IP address of the encapsulated packet is the IP address of the second open flow switch (OFS) 2-2.

(Step S8)

The second open flow switch (OFS) 2-2 receives the encapsulated packet from the first open flow switch (OFS) 2-1. The second open flow switch (OFS) 2-2 extracts the tenant identification data and the IP addresses of the first open flow switch (OFS) 2-1 as a source gateway from the addition data which is contained in the encapsulated packet, and extracts the IP address of the SAN 6 as a destination equipment and the IP address of the source virtual machine (VM) 4-1 from the header data of the packet other than the addition data, and records them in the address translation table 29. Also, the second open flow switch (OFS) 2-2 allocates DUM to the source IP address (allocated IP address of the address translation table 29) used for the transfer of data contained in the encapsulated packet. In this example, the record of the address translation table 29 corresponding to the encapsulated packet is set to be shown in FIG. 12.

(Step S9)

The second open flow switch (OFS) 2-2 removes the addition data given at the step S7 based on the flow entry set at the step S5, i.e. decapsulates the encapsulated packet.

(Step S10)

The second open flow switch (OFS) 2-2 translates the transmission source IP address into DUM based on the address translation table 29 of FIG. 12. Note that in the address translation table 29 of the second open flow switch (OFS) 2-2 shown in FIG. 12, the destination port number and the allocated port number are not used. In this way, the packet may be rewritten by using only the destination IP address, the destination tenant, the allocated IP address and the source gateway. That is, the second open flow switch (OFS) 2-2 rewrites the packet by using a NAT function or an IP masquerade function. For example, when the NAT function is used, the second open flow switch (OFS) 2-2 outputs a unique IP address as the DUM for every source virtual machine (VM) from the plurality of IP addresses managed by the second open flow switch (OFS) 2-2. Or, when the IP masquerade function is used, the second open flow switch (OFS) 2-2 outputs a unique set of an IP address and a port number as the DUM for every source virtual machine (VM) from the plurality of IP addresses and the plurality of port numbers managed by the second open flow switch (OFS) 2-2.

(Step S11)

The second open flow switch (OFS) 2-2 transmits for the SAN 6, the packet that the source IP address has been rewritten at the step S9.

(Step S12)

The SAN 6 receives the rewritten packet through the bridge 5. Note that the SAN 6 may be connected with the second open flow switch (OFS) 2-2 without going through the bridge 5.

This is the packet transferring method (out-bound) of the present exemplary embodiment. Note that the above-mentioned description is made for the operation when the first open flow switch (OFS) 2-1 receives the packet transmitted from the virtual machine (VM) 4-1 to the SAN 6 for the first time (the first packet). The second and subsequent packets received by the first open flow switch (OFS) are transferred by the open flow switches (OFS) 2 on the transfer route based on the flow entries set at the step S5.

Figure 13:
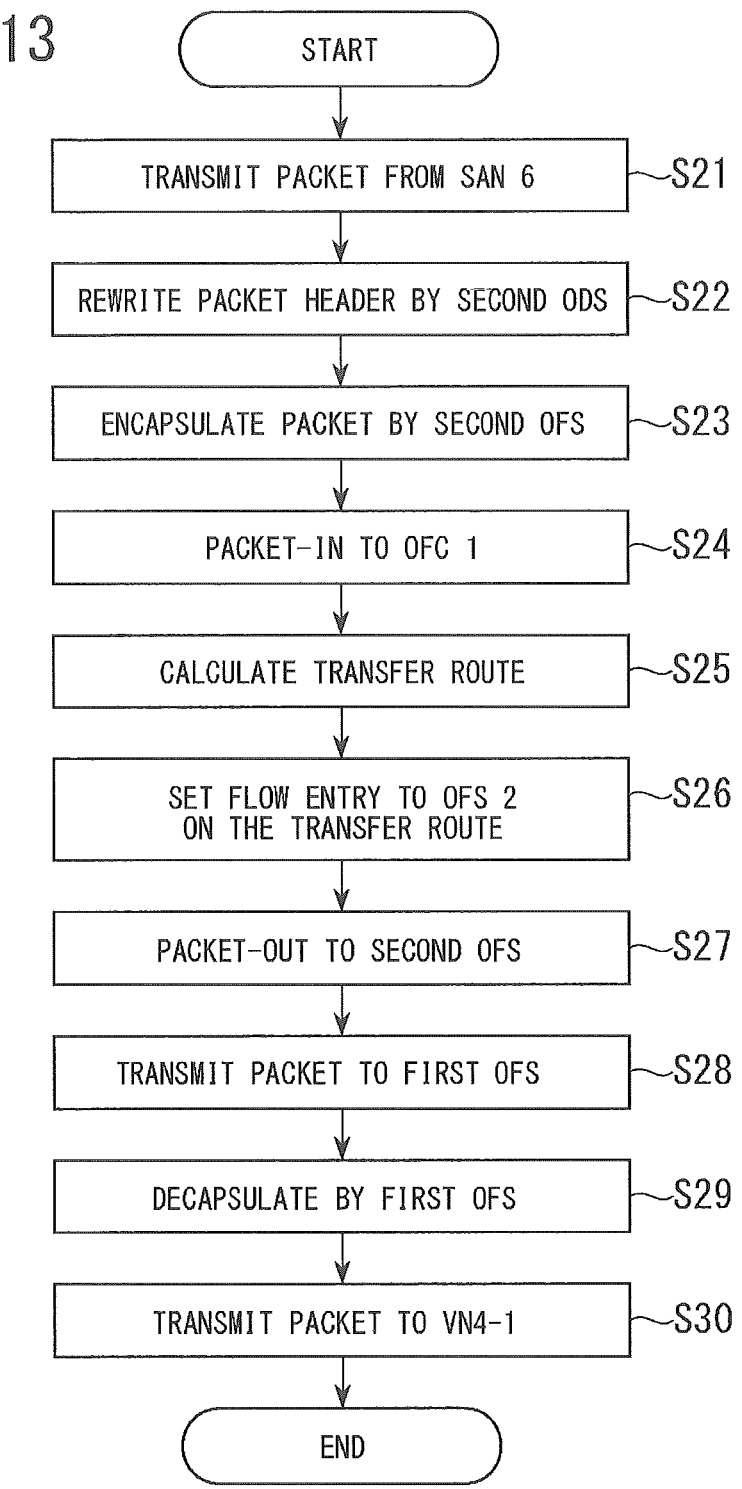
FIG. 13 is a flow chart of the packet transferring method (in-bound) in the multi-tenant system according to the first exemplary embodiment of the present invention.
Figure 14:
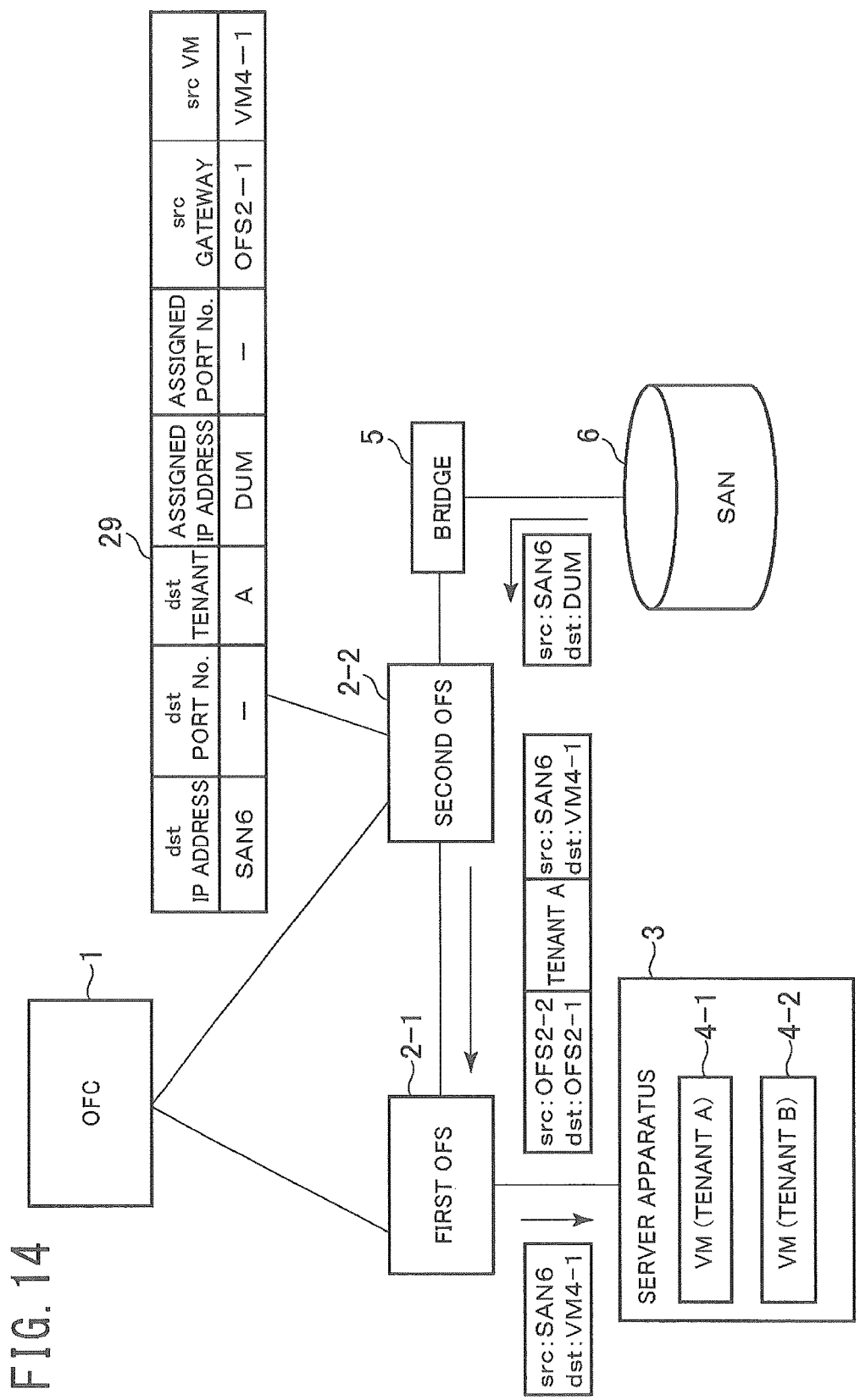
FIG. 14 is a diagram schematically showing a packet on an in-bound route (SAN 6→virtual machine (VM) 4-1) in the packet transferring method (in-bound) of FIG. 13.

Next, a packet transferring method (in-bound) will be described. FIG. 13 is a flow chart of the packet transferring method (in-bound) in the multi-tenant system according to the first exemplary embodiment of the present invention. FIG. 14 is a diagram schematically showing a packet on the in-bound route (SAN 6→virtual machine (VM) 4-1) in the packet transferring method (in-bound) of FIG. 13. The operation when the second open flow switch (OFS) 2-2 receives the packet destined to the virtual machine (VM) 4-1 from the SAN 6 to for the first time will be described below.

(Step S21)

The SAN 6 which is the identification impossible unit transmits a reply packet to the packet received at the step S12 to the virtual machine (VM) 4-1. Note that the packet (src: SAN 6, dst: DUM) which is transmitted from the SAN 6 toward the second open flow switch (OFS) 2-2 through the bridge 5 corresponds to the packet in FIG. 14.

(Step S22)

Because the destination IP address of the received packet is DUM, the second open flow switch (OFS) 2-2 refers to the address translation table 29 to translate the destination IP address. In this case, the second open flow switch (OFS) 2-2 refers to the source virtual machine (VM) of the address translation table 29 of FIG. 14 to translate the destination IP address from the DUM to the virtual machine (VM) 4-1.

(Step S23)

The second open flow switch (OFS) 2-2 encapsulates the packet having the address translated at the step S22. In detail, the second open flow switch (OFS) 2-2 encapsulates the packet transmitted at the step S21 by adding the addition data, to produce an encapsulated packet. In this case, the second open flow switch (OFS) 2-2 refers to the source gateway of the address translation table 29 to specify that the source gateway is the first open flow switch (OFS) 2-1. The second open flow switch (OFS) 2-2 refers to the destination tenant of the address translation table 29 to specify the tenant data to be included in the addition data. The second open flow switch (OFS) 2-2 makes the addition data include an L3 header (source IP address: open flow switch (OFS) 2-2, destination IP address: open flow switch (OFS) 2-1) and tenant identification data (tenant A).

(Step S24)

Because the encapsulated packet is the first packet, the second open flow switch (OFS) 2-2 carries out packet-in of the encapsulated packet into the open flow controller (OFC) 1.

(Step S25)

The open flow controller (OFC) 1 calculates the in-bound route based on the encapsulated packet subjected to the packet-in. In this case, the open flow controller (OFC) 1 specifies a source equipment and a destination virtual machine (VM) from the source IP address and the destination IP address of the packet obtained by decapsulating the encapsulated packet subjected to the packet-in, and specifies an end edge (gateway) connected with the destination virtual machine (VM) by using topology data (not shown) and calculates the in-bound route.

(Step S26)

The open flow controller (OFC) 1 sets the flow entries for transferring the encapsulated packet to the switches on the in-bound route calculated at the step S25. Note that only the first open flow switch (OFS) 2-1 and the second open flow switch (OFS) 2-2 are shown in FIG. 14 to simplify the description, but a plurality of open flow switches (OFS) 2 may exist between the first open flow switch (OFS) 2-1 and the second open flow switch (OFS) 2-2. In such a case, the flow entries are respectively set to the open flow switches (OFS) 2 between the first open flow switch (OFS) 2-1 and the second open flow switch (OFS) 2-2.

Also, the open flow controller (OFC) 1 sets the flow entry which prescribes the decapsulating operation of removing the addition data to the last open flow switch (OFS) 2 on the in-bound route (the first open flow switch (OFS) 2-1 connected with the virtual machine (VM) 4-1).

(Step S27)

The open flow controller (OFC) 1 carries out packet-out of the encapsulated packet subjected to the packet-in at the step S24, to the second open flow switch (OFS) 2-2.

(Step S28)

The second open flow switch (OFS) 2-2 transmits the encapsulated packet to the first open flow switch (OFS) 2-1 according to the flow entry set at the step S26.

(Step S29)

The first open flow switch (OFS) 2-1 removes the addition data added at the step S23 from the encapsulated packet based on the flow entry set at the step S26. Also, the first open flow switch (OFS) 2-1 refers to the tenant data contained in the addition data to check the transmission destination of the decapsulated packet, i.e. the packet that the addition data has been removed.

(Step S30)

The first open flow switch (OFS) 2-1 transmits the decapsulated packet to the virtual machine (VM) 4-1. The virtual machine (VM) 4-1 receives the decapsulated packet.

According to the present exemplary embodiment, the multi-tenant system is provided which can use the equipment whose tenant identification data cannot be recognized.

Next, as an example of the multi-tenant system in which a part of the configuration of the multi-tenant system according to the first exemplary embodiment of the present invention is changed, a second exemplary embodiment will be described.

[Second Exemplary Embodiment]

(Configuration)

First, the configuration of the multi-tenant system of a second exemplary embodiment will be described. Because the whole configuration of the multi-tenant system of the present exemplary embodiment is same as that of the multi-tenant system of the first exemplary embodiment shown in FIG. 3, the detailed description is omitted.

Figure 15:
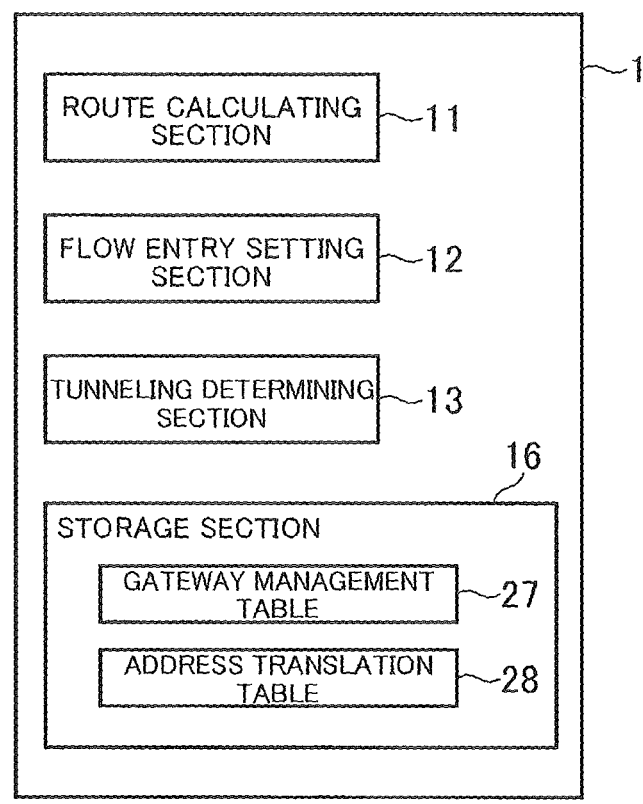
FIG. 15 is a block diagram of the open flow controller (OFC) 1 in the multi-tenant system according to a second exemplary embodiment of the present invention.

FIG. 15 is a block diagram of the open flow controller (OFC) 1 in the multi-tenant system of the second exemplary embodiment of the present invention. The open flow controller (OFC) 1 of the present exemplary embodiment includes the route calculating section 11, the flow entry setting section 12, a tunneling determining section 13 and a storage section 16. The storage section 16 stores a tenant management table 27 and a gateway management table 28. The route calculating section 11 calculates the transfer route based on the packet subjected to the packet-in from the open flow switch (OFS) 2. The flow entry setting section 12 sets the flow entries which are necessary for the transfer control of the packet, to the open flow switches (OFS) 2 on the transfer route calculated by the route calculating section 11. The tunneling determining section 13 determines whether or not the packet received from the open flow switch (OFS) 2 has been encapsulated. Also, the tunneling determining section 22 determines whether or not the packet received from the open flow switch (OFS) 2 has to be encapsulated.

Figure 16:
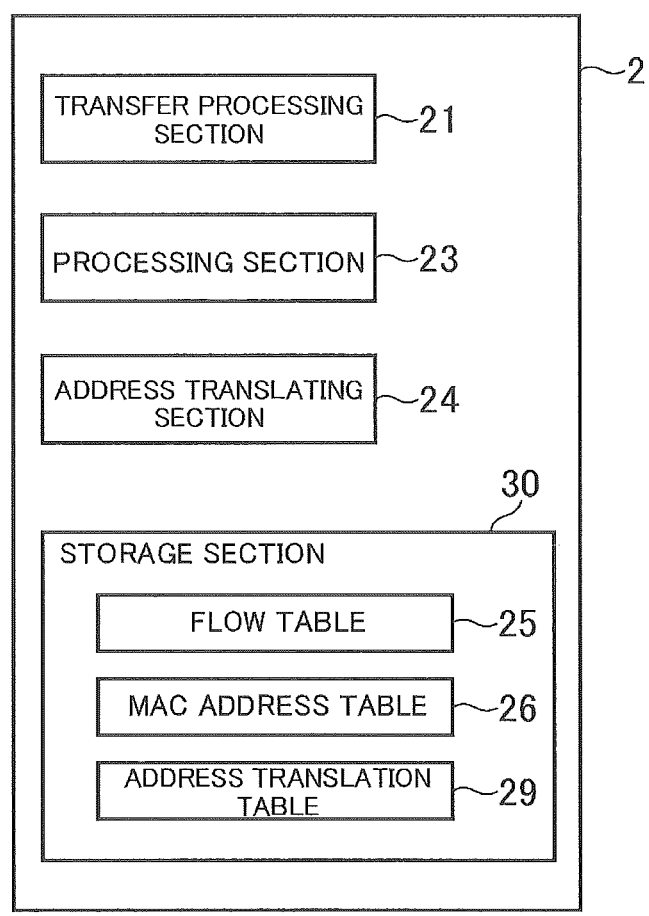
FIG. 16 is a block diagram of the open flow switch (OFS) 2 in the multi-tenant system according to the second exemplary embodiment of the present invention.

FIG. 16 is a block diagram of the open flow switch (OFS) 2 in the multi-tenant system according to the second exemplary embodiment of the present invention. The open flow switch (OFS) 2 of the present exemplary embodiment includes the transfer processing section 21, the processing section 23, the address translating section 24 and a storage section 30. The storage section 30 stores the flow table 25, the MAC address table 26 and the address translation table 29.

Because the transfer processing section 21 transfers the packet to a destination determined based on the respective tables which are stored in the storage section 30. The processing section 23 carries out the encapsulation of the packet received from the open flow switch (OFS) 2 and decapsulation of the encapsulated packet. The address translating section 24 translates an IP address and a port number, which are contained in the packet, based on the address translation table 29. Note that the translation may be only either of the IP address or the port number.

The configuration of each of the tables which are stored in the storage section 16 of the open flow controller (OFC) 1 and the storage section 30 of the open flow switch (OFS) 2 is the same as that of each table in the first exemplary embodiment, and therefore, a detailed description is omitted. (Operation) Next, a packet transferring method in the multi-tenant system of the present exemplary embodiment will be described. Because the packet transferring method (in-bound) in the present exemplary embodiment is same as that of the first exemplary embodiment, only a packet transferring method (out-bound) will be described.

Figure 17:
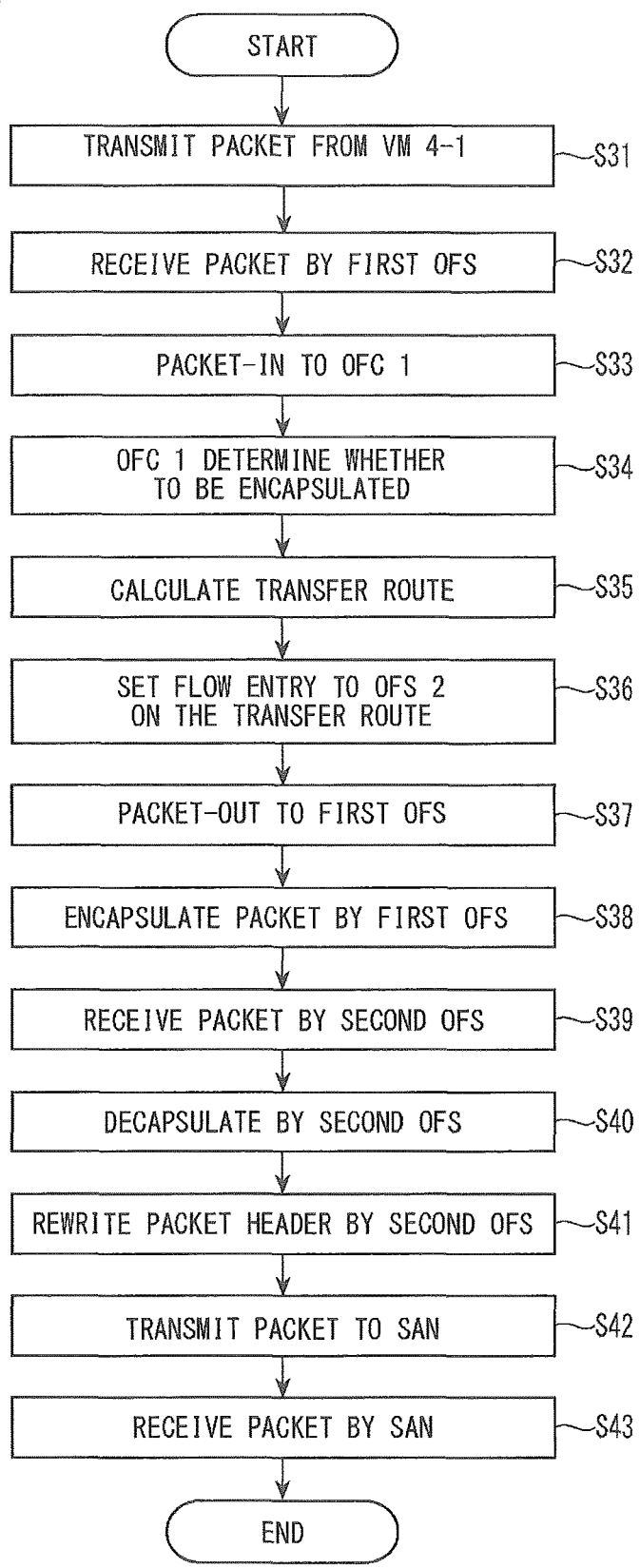
FIG. 17 is a flow chart of the packet transferring method (out-bound) in the multi-tenant system according to the second exemplary embodiment of the present invention.

First, the packet transferring method (out-bound) will be described. FIG. 17 is a flow chart of the packet transferring method (out-bound) in the multi-tenant system according to the second exemplary embodiment of the present invention. FIG. 17 is same as FIG. 12 with respect to the diagram schematically showing the packet on the out-bound route (virtual machine (VM) 4-1→SAN 6).
(Step S31)

The virtual machine (VM) 4-1 which belongs to the tenant system transmits a packet to the SAN 6 which is an identification impossible unit. Note that in FIG. 12, the packet (src: virtual machine (VM) 4-1, dst: SAN 6) which is transmitted to the first open flow switch (OFS) 2-1 from the server apparatus 3 corresponds to the packet. Here, "src: virtual machine (VM) 4-1" means that the source IP address is an IP address which is allocated to the virtual machine (VM) 4-1. In the same way, "dst: SAN 6" means that the destination IP address is an IP address which is allocated to the SAN 6.
(Step S32)

The first open flow switch (OFS) 2-1 receives the packet transmitted at the step S31.
(Step S33)

Because there is not a flow entry which prescribes an operation of receiving the packet (because the first packet is received), the first open flow switch (OFS) 2-1 carries out the packet-in of the packet into the open flow controller (OFC) 1.
(Step S34)

The open flow controller (OFC) 1 determines whether or not the packet has to be encapsulated based on a destination MAC address of the packet subjected to the packet-in at the step S33. When the destination MAC address is not one of MAC addresses managed by the first open flow switch (OFS) 2-1, the open flow controller (OFC) 1 determines to have to transmit the packet through other open flow switches (OFS) 2. When the open flow controller (OFC) 1 determines to have to transmit the packet through other open flow switches (OFS) 2, the open flow controller (OFC) 1 determines that the packet has to be encapsulated.
(Step S35)

The open flow controller (OFC) 1 specifies that the open flow switch (OFS) 2 connected with the SAN 6 as the destination of the packet subjected to the packet-in is the second open flow switch (OFS) 2-2, based on topology data (not shown). The open flow controller (OFC) 1 calculates the out-bound route used to transmit the packet, subjected to the packet-in, to the second open flow switch (OFS) 2-2.
(Step S36)

The open flow controller (OFC) 1 sets the flow entries used to transfer the packet to the switches on the out-bound route calculated at the step S35. Note that only the first open flow switch (OFS) 2-1 and the second open flow switch (OFS) 2-2 are shown in FIG. 12 in order to simplify the description. However, a plurality of open flow switches (OFS) 2 may exist between the first open flow switch (OFS) 2-1 and the second open flow switch (OFS) 2-2. In this case, flow entries are set to the open flow switches (OFS) 2 between the first open flow switch (OFS) 2-1 and the second open flow switch (OFS) 2-2.

Also, the open flow controller (OFC) 1 sets a flow entry which prescribes an operation of encapsulating the packet by adding the addition data to the first open flow switch (OFS) 2-1 as a packet-in source.

Also, the open flow controller (OFC) 1 sets a flow entry which prescribes a decapsulating operation of removing the addition data to the second open flow switch (OFS) 2-2 as a termination edge connected with the identification impossible unit.
(Step S37)

The open flow controller (OFC) 1 carries out the packet-out of the packet subjected to the packet-in at the step S32, to the first open flow switch (OFS) 2-1. When the open flow controller (OFC) 1 determines that the first open flow switch (OFS) 2-1 has to encapsulate the packet subjected to the packet-in at the step S34 and has to transfer the encapsulated packet, the open flow controller (OFC) 1 make a Packet-Out message include the packet and the tenant identification data of the packet.
(Step S38)

The first open flow switch (OFS) 2-1 encapsulates the packet subjected to the packet-in (the packet received at the step S2) based on the flow entry set by the open flow controller (OFC) 1 by adding the addition data to produce an encapsulated packet. For example, the addition data contains an L3 header (source IP address: open flow switch (OFS) 2-1, destination IP address: open flow switch (OFS) 2-2) and the tenant identification data (tenant A). Here, the "source IP address: open flow switch (OFS) 2-1" means that the source IP address of the encapsulated packet is an IP address of the first open flow switch (OFS) 2-1. In the same way, the "destination IP address: open flow switch (OFS) 2-2" means that the destination IP address of the encapsulated packet is an IP address of the second open flow switch (OFS) 2-2.
(Step S39)

The second open flow switch (OFS) 2-2 receives the encapsulated packet from the first open flow switch (OFS) 2-1.

(Step S40)

The second open flow switch (OFS) 2-2 removes the addition data added at the step S37 based on the flow entry set to at the step S36.

(Step S41)

The second open flow switch (OFS) 2-2 translates the source IP address into DUM based on the address translation table 29 of FIG. 12, like the first exemplary embodiment.

(Step S42)

The second open flow switch (OFS) 2-2 transmits to the SAN 6, the packet in which the source IP address has been rewritten at the step S40.

(Step S43)

The SAN 6 receives the rewritten packet through the bridge 5. Note that the SAN 6 may be connected with the second open flow switch (OFS) 2-2 without going through the bridge 5.

According to the present exemplary embodiment, the multi-tenant system is provided which can use existing identification impossible unit. Note that the description of the exemplary embodiments of the present invention have been made by using the SAN as an example of the identification impossible unit. However, the identification impossible unit is not limited to the SAN and the present invention may be applied to other units (equipments).

In the above, the exemplary embodiments of the present invention have been described with reference to the attached drawings. However, the present invention is not limited to the above-mentioned exemplary embodiments and can be appropriately modified by a skilled person in the art in a range which does not deviate from the scope of the present invention.

Note that this application claims a priority on convention based on Japanese Patent Application No. JP 2012-111881. The disclosure thereof is incorporated herein by reference.

The invention claimed is:

1. A multi-tenant system comprising:
a server apparatus on which a virtual machine with tenant identification data given operates;
a plurality of switches, each of which comprises a processing section which processes a packet based on a flow entry set to said switch; and
a controller configured to set the flow entry to each of said plurality of switches,
wherein said plurality of switches includes a first switch connected with said server apparatus and a second switch connected with an equipment whose tenant identification data cannot be recognized,
wherein said controller comprises a flow entry setting section configured to set to said first switch, the flow entry which prescribes an operation of encapsulating a packet which is transmitted from said virtual machine on said server apparatus, by adding addition data which includes the tenant identification data, and set to said second switch, the flow entry which prescribes a decapsulating operation of removing the addition data from the encapsulated packet, and
wherein said second switch comprises:
an address translating section configured to translate a source address of the decapsulated packet by said processing section, into an IP address managed by said second switch; and
a transfer processing section configured to transfer the packet, whose source address has been translated, for said equipment,
wherein said second switch stores in said address translation table, an IP address of said first switch, a IP address of said virtual machine as a transmission source and the tenant identification data which are contained in the encapsulated packet when the encapsulated packet is received,
wherein said flow entry setting section of said controller sets to said second switch, the flow entry which prescribes the operation of encapsulating the packet transmitted from said equipment by adding the addition data containing the tenant identification data, and sets to said first switch, the flow entry which prescribes the decapsulating operation of removing the addition data from the encapsulated packet,
wherein said transfer processing section of said second switch receives a reply packet transmitted to said virtual machine from said equipment,
wherein said address translating section of said second switch translates a destination IP address of the reply packet into the IP address of said virtual machine based on said address translation table,
wherein said the processing section of said second switch encapsulates the reply packet subjected to the translation of the source IP address, to the encapsulated reply packet in which the addition data containing the tenant identification data of said virtual machine has been added, wherein an IP address of said first switch of said address translation table is set as a destination IP address of an L3 header of the addition data,
wherein said processing section of said first switch decapsulates the encapsulated reply packet by removing the addition data from the encapsulated reply packet, and
wherein said transfer processing section of said first switch transmits the decapsulated reply packet to said virtual machine.

2. The multi-tenant system according to claim 1, wherein said controller carries out packet-out of a packet-out message which includes the packet and the tenant identification data of the packet, and
wherein said processing section of said first switch encapsulates the packet based on the packet-out message.

3. The multi-tenant system according to claim 1, wherein said address translating section of said second switch translates a source port number of the packet into a port number managed by said second switch and translates a destination port number of the reply packet into a source port number before the translation.

4. A packet transferring method in a multi-tenant system, comprising:
transmitting a packet from a virtual machine (VM) to an equipment whose tenant identification data cannot be recognized;
carrying out packet-in of the packet into a controller by a first switch;
calculating an out-bound route of the packet by said controller;
setting flow entries for packet transfer into switches on the out-bound route by said controller;
wherein said setting comprises setting to the first switch, a flow entry which prescribes an operation of encapsulating the packet by adding addition data which contains tenant identification data of said virtual machine (VM) to the packets, and setting in said second switch, a flow entry which prescribes a decapsulating operation of removing the addition data from the encapsulated packet;

encapsulating, by said first switch, the packet based on the set flow entry by adding the addition data which contains the tenant identification data of said virtual machine (VM);
receiving the encapsulated packet by said second switch;
removing by said second switch, the addition data from the encapsulated packet based on the flow entry set in said second switch;
translating a transmission IP address of the decapsulated packet from which the addition data has been removed into an IP address managed by said second switch based on an address translation table; and
transmitting the translated packet to said equipment by said second switch, further comprising:
recording in the address translation table by said second switch which has received the encapsulated packet, an IP address of said first switch, an IP address of a source virtual machine (VM), and the tenant identification data which are contained in the encapsulated packet;
transmitting a reply packet from said equipment to said virtual machine (VM);
translating a destination IP address into the IP address of said source virtual machine (VM) based on the address translation table by said second switch;
encapsulating the reply packet by adding the addition data which contains the tenant identification data of said virtual machine (VM) by said second switch to produce an encapsulated reply packet;
setting the IP address of said first switch to the address translation table as a destination IP address of an L3 header in the addition data;
carrying out packet-in of the encapsulated reply packet into said controller by said second switch;
calculating an in-bound route of the encapsulated reply packet by said controller;
setting to the switches on the in-bound route, the flow entries for transferring the encapsulated reply packet by said controller;
wherein setting a flow entry which prescribes an operation of removing the addition data, to said first switch;
carrying out packet-out of the encapsulated reply packet to said second switch by said controller;
transmitting the encapsulated reply packet to said first switch from said second switch;
receiving the encapsulated reply packet by said first switch;
removing the addition data based on the flow entry by said first switch to produce a decapsulated reply packet; and
transmitting the decapsulated reply packet to said virtual machine (VM) by said first switch.

5. The packet transferring method according to claim 4, further comprising:
carrying out packet-out of a packet-out message which contains the packet and the tenant identification data of the said packet by said controller.

6. The packet transferring method according to claim 4, wherein said encapsulating the packet comprises encapsulating the packet in which a source port number of the packet is translated into a port number managed by said second switch; and
wherein said encapsulating the reply packet comprises encapsulating the reply packet in which a destination port number of the reply packet into a source port number before the translation.

\* \* \* \* \*